US012106693B2

(12) United States Patent
Ban et al.

(10) Patent No.: US 12,106,693 B2
(45) Date of Patent: Oct. 1, 2024

(54) DISPLAY DEVICE AND METHOD OF DRIVING THE SAME

(71) Applicant: Samsung Display Co., Ltd., Yongin-si (KR)

(72) Inventors: Seokgyu Ban, Suwon-si (KR); Kyungman Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/224,917

(22) Filed: Jul. 21, 2023

(65) Prior Publication Data

US 2023/0360575 A1 Nov. 9, 2023

Related U.S. Application Data

(63) Continuation of application No. 17/971,139, filed on Oct. 21, 2022, now Pat. No. 11,727,845.

(30) Foreign Application Priority Data

Mar. 11, 2022 (KR) ........................ 10-2022-0030736

(51) Int. Cl.
*G09G 3/20* (2006.01)

(52) U.S. Cl.
CPC ....... *G09G 3/20* (2013.01); *G09G 2300/0819* (2013.01); *G09G 2320/0233* (2013.01); *G09G 2320/043* (2013.01); *G09G 2320/045* (2013.01); *G09G 2320/0693* (2013.01); *G09G 2360/147* (2013.01); *G09G 2360/16* (2013.01)

(58) Field of Classification Search
CPC ............ G09G 3/20; G09G 2300/0819; G09G 2320/0233; G09G 2320/045; G09G 2320/0693; G09G 2360/147; G09G 2360/16
See application file for complete search history.

(56) References Cited

U.S. PATENT DOCUMENTS

| | | | |
|---|---|---|---|
| 8,558,767 | B2 | 10/2013 | Kwon |
| 9,570,002 | B2 | 2/2017 | Sakariya et al. |
| 9,666,120 | B2 | 5/2017 | Lee et al. |
| 9,741,286 | B2 | 8/2017 | Sakariya et al. |
| 9,837,014 | B2 | 12/2017 | Kim et al. |
| 11,004,376 | B2 | 5/2021 | Choi et al. |
| 11,100,847 | B2 | 8/2021 | Choi et al. |
| 2020/0058252 | A1 | 2/2020 | Kim et al. |
| 2022/0343864 | A1 | 10/2022 | Kim |

FOREIGN PATENT DOCUMENTS

| | | | |
|---|---|---|---|
| KR | 101270188 | B1 | 6/2013 |
| KR | 1020190070046 | A | 6/2019 |
| KR | 1020200032509 | A | 3/2020 |
| KR | 1020200057525 | A | 5/2020 |

*Primary Examiner* — Gene W Lee
(74) *Attorney, Agent, or Firm* — CANTOR COLBURN LLP

(57) ABSTRACT

A display device includes a display panel including pixels, and a display panel driver configured to perform a first sensing operation to receive first sensing data for a driving transistor of each of the pixels from the pixels, to perform a second sensing operation to receive second sensing data for a light emitting element, and to determine a degradation rate of the light emitting element based on the first sensing data and the second sensing data.

20 Claims, 8 Drawing Sheets

SD1=VREF-VTH

SD1=VREF-VTH

DISPLAY DEVICE AND METHOD OF DRIVING THE SAME

This application is a continuation of U.S. patent application Ser. No. 17/971,139, filed on Oct. 21, 2022, which claims priority to Korean Patent Application No. 10-2022-0030736, filed on Mar. 11, 2022, and all the benefits accruing therefrom under 35 U.S.C. § 119, the content of which in its entirety is herein incorporated by reference.

BACKGROUND

1. Field

Embodiments of the present invention relate to a display device and a method of driving a display device. More particularly, embodiments of the present invention relate to a display device performing a sensing operation and a method of driving the display device.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

SUMMARY

As a driving time of the display device increases, pixels (or a light emitting element included in the pixels) may be degraded. To compensate for a degradation of the pixels, the display device may perform a sensing operation for sensing characteristics of a driving transistor of each of the pixels (e.g., a threshold voltage and/or a mobility) and characteristics of a light emitting element of the pixels (e.g., a voltage-current characteristic). The display device may display an image having a uniform luminance by compensating for input image data based on sensing data generated by the sensing operation.

Embodiments of the present invention provide a display device that determines a degradation rate of a light emitting element by reflecting an intensity of stress applied to the light emitting element during a degradation time.

Embodiments of the present invention also provide a method of driving the display device.

According to embodiments of the present invention, a display device includes: a display panel including pixels, and a display panel driver configured to perform a first sensing operation to receive first sensing data for a driving transistor of each of the pixels from the pixels, to perform a second sensing operation to receive second sensing data for a light emitting element, and to determine a degradation rate of the light emitting element based on the first sensing data and the second sensing data.

In an embodiment, the display panel driver may be configured to calculate a threshold voltage of the driving transistor based on the first sensing data.

In an embodiment, the display panel driver may be configured to apply a voltage equal to a sum of the threshold voltage and a reference voltage to a control electrode of the driving transistor in a first period and a second period of the second sensing operation, the display panel driver may be configured to apply an initialization voltage to an anode electrode of the light emitting element in the first period of the second sensing operation, the display panel driver may be configured to apply the initialization voltage to the anode electrode of the light emitting element in a third period of the second sensing operation, and the display panel driver may be configured to receive the second sensing data corresponding to a driving current value of the pixels in a fourth period of the second sensing operation.

In an embodiment, the second sensing operation may be performed after the first sensing operation is performed.

In an embodiment, the display panel driver may be configured to calculate an change amount of the threshold voltage of the driving transistor, to calculate a change rate of the second sensing data, and to determine the degradation rate of the light emitting element based on the change rate of the second sensing data and the change amount of the threshold voltage of the driving transistor.

In an embodiment, the degradation of the light emitting element may be determined using equations $$RSD2 = \frac{SD2}{ISD2}$$

and $$DR = RSD2 + \frac{2 \times \Delta VTH}{(ISD2/K)^{\frac{1}{2}}} \times RSD2^{\frac{1}{2}} + \frac{(\Delta VTH)^2}{(ISD2/K)},$$

where RSD2 is the change rate of the second sensing data, SD2 is the second sensing data, ISD2 is initial second sensing data, DR is the degradation rate of the light emitting element, ΔVTH is the change amount of the threshold voltage of the driving transistor, and K is a current characteristic coefficient of the driving transistor.

According to embodiments of the present invention, a method of driving a display device includes: performing a first sensing operation to receive first sensing data for a driving transistor of each of pixels from the pixels, performing a second sensing operation to receive second sensing data for a light emitting element of the pixels from the pixels, and determining a degradation rate of the light emitting element based on the first sensing data and the second sensing data.

In an embodiment, the method may further include calculating a threshold voltage of the driving transistor based on the first sensing data.

In an embodiment, the receiving of the second sensing data may include applying a voltage equal to a sum of the threshold voltage and a reference voltage to a control electrode of the driving transistor in a first period and a second period of the second sensing operation, applying an initialization voltage to an anode electrode of the light emitting element in the first period of the second sensing operation, applying the initialization voltage to the anode electrode of the light emitting element in a third period of the second sensing operation, and receiving the second sensing data corresponding to a driving current value of the pixels in a fourth period of the second sensing operation.

In an embodiment, the second sensing operation may be performed after the first sensing operation is performed.

In an embodiment, the determining of the degradation rate of the light emitting element may include calculating an change amount of the threshold voltage of the driving transistor, calculating a change rate of the second sensing data, and determining the degradation rate of the light emitting element based on the change rate of the second sensing data and the change amount of the threshold voltage of the driving transistor.

In an embodiment, the degradation rate of the light emitting element may be determined using equations $$RSD2 = \frac{SD2}{ISD2}$$

and $$DR = RSD2 + \frac{2 \times \Delta VTH}{(ISD2/K)^{\frac{1}{2}}} \times RSD2^{\frac{1}{2}} + \frac{(\Delta VTH)^2}{(ISD2/K)},$$

where RSD2 is the change rate of the second sensing data, SD2 is the second sensing data, ISD2 is initial second sensing data, DR is the degradation rate of the light emitting element, ΔVTH is the change amount of the threshold voltage of the driving transistor, and K is a current characteristic coefficient of the driving transistor.

According to embodiments of the present invention, a method of driving a display device includes performing a first sensing operation to receive first sensing data for a driving transistor of each of pixels from the pixels, performing a second sensing operation to receive second sensing data for a light emitting element of the pixels from the pixels, measuring an ambient temperature of a display panel including the pixels, and determining a degradation rate of the light emitting element based on the first sensing data, the second sensing data, and the ambient temperature.

In an embodiment, the method may further include calculating a threshold voltage of the driving transistor based on the first sensing data.

In an embodiment, the receiving of the second sensing data may include applying a voltage equal to a sum of the threshold voltage and a reference voltage to a control electrode of the driving transistor in a first period and a second period of the second sensing operation, applying an initialization voltage to an anode electrode of the light emitting element in the first period of the second sensing operation, applying the initialization voltage to the anode electrode of the light emitting element in a third period of the second sensing operation, and receiving the second sensing data corresponding to a driving current value of the pixels in a fourth period of the second sensing operation.

In an embodiment, the second sensing operation may be performed after the first sensing operation is performed.

In an embodiment, the determining the degradation rate of the light emitting element may include calculating an change amount of the threshold voltage of the driving transistor, calculating a change rate of the second sensing data, and determining the degradation rate of the light emitting element based on the change rate of the second sensing data, the change amount of the threshold voltage of the driving transistor, and the ambient temperature.

In an embodiment, the determining of the degradation rate of the light emitting element may further include: determining a first change rate of a driving current due to the ambient temperature when the second sensing data is received based on a temperature-driving current lookup table for a change rate of the driving current according to a temperature, and determining a second change rate of the driving current due to the ambient temperature when initial second sensing data is received based on the temperature-driving current lookup table, and the degradation rate of the light emitting element may be determined based on the change amount of the threshold voltage of the driving transistor, the change rate of the second sensing data, the first change rate of the driving current, and the second change rate of the driving current.

In an embodiment, the degradation rate of the light emitting element may be determined using equations $$RSD2 = \frac{SD2}{ISD2}$$

and $$DR = \left(RSD2 \times \frac{CR2}{CR1}\right) + \frac{2 \times \Delta VTH}{(ISD2/K)^{\frac{1}{2}}} \times \left(RSD2 \times \frac{CR2}{CR1}\right)^{\frac{1}{2}} + \frac{(\Delta VTH)^2}{(ISD2/K)},$$

where RSD2 is the change rate of the second sensing data, SD2 is the second sensing data, ISD2 is the initial second sensing data, DR is the degradation rate of the light emitting element, ΔVTH is the change amount of the threshold voltage of the driving transistor, K is a current characteristic coefficient of the driving transistor, CR1 is the first change rate of the driving current, and CR2 is the second change rate of the driving current.

Therefore, the display device may determine a degradation rate of a light emitting element by reflecting an intensity of stress applied to the light emitting element during a degradation time by performing a first sensing operation to receive first sensing data for a driving transistor of each of the pixels from the pixels, performing a second sensing operation to receive second sensing data for the light emitting element, and determining the degradation rate of the light emitting element based on the first sensing data and the second sensing data. Accordingly, the display device may reduce an influence of the intensity of the stress applied to the light emitting element in determining the degradation rate of the light emitting element.

In addition, a method of driving a display device may reduce an influence of an intensity of stress applied to a light emitting element in compensating for input image data by determining a degradation rate of a light emitting element by reflecting an intensity of stress applied to the light emitting element during a degradation time Further, a method of driving a display device may determine a degradation rate of a light emitting element by reflecting an intensity of stress applied to the light emitting element and an ambient temperature of a display panel during a degradation time by performing a first sensing operation to receive first sensing data for a driving transistor of each of pixels from the pixels, performing a second sensing operation to receive second sensing data for the light emitting element of the pixels from the pixels, measuring the ambient temperature of the display panel including the pixels, and determining the degradation rate of the light emitting element based on the first sensing data, the second sensing data, and the ambient temperature. Accordingly, the display device may effectively reduce an influence of the intensity of the stress applied to the light emitting element in determining the degradation rate of the light emitting element.

However, the effects of the present invention are not limited to the above-described effects, and may be variously expanded without departing from the spirit and scope of the present invention.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the present invention will be explained in detail with reference to the accompanying drawings.

Figure 1:
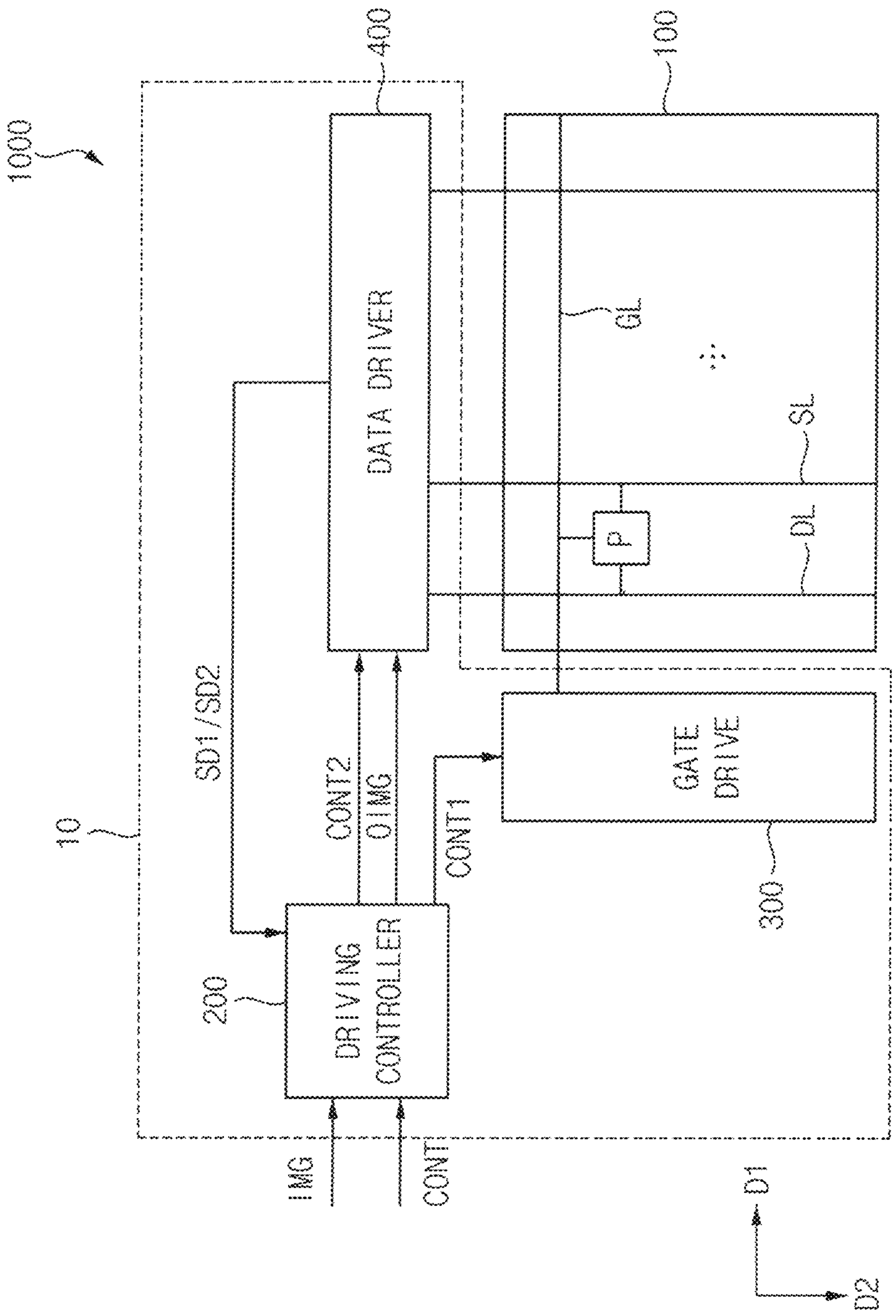
FIG. 1 is a block diagram illustrating a display device according to embodiments of the present invention.

FIG. 1 is a block diagram illustrating a display device 1000 according to embodiments of the present invention.

Referring to FIG. 1, the display device 1000 may include a display panel 100 and a display panel driver 10. The display panel driver 10 may include a driving controller 200, a gate driver 300, and a data driver 400. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of sensing lines SL, and a plurality of pixels P electrically connected to the data lines DL, the gate lines GL, and the sensing lines SL. The gate lines GL may extend in a first direction D1 and the data lines DL and the sensing lines SL may extend in a second direction D2 crossing the first direction D1.

The driving controller 200 may receive input image data IMG and an input control signal CONT from a host processor (e.g., a graphic processing unit: GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal. The driving controller 200 may receive first sensing data SD1 and second sensing data SD2 from the data driver 400.

The driving controller 200 may generate a first control signal CONT1, a second control signal CONT2, and output image data OIMG based on the input image data IMG, the first sensing data SD1, the second sensing data SD2, and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG, the first sensing data SD1, the second sensing data SD2, and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL. The data driver 400 may receive the first sensing data SD1 and the second sensing data SD2 from the pixels P. A detailed description thereof will be given later. In an embodiment, the data driver 400 may convert the received first sensing data SD1 and the received second sensing data SD2 from an analog signal format into a digital signal format to apply the driving controller 200.

Figure 2:
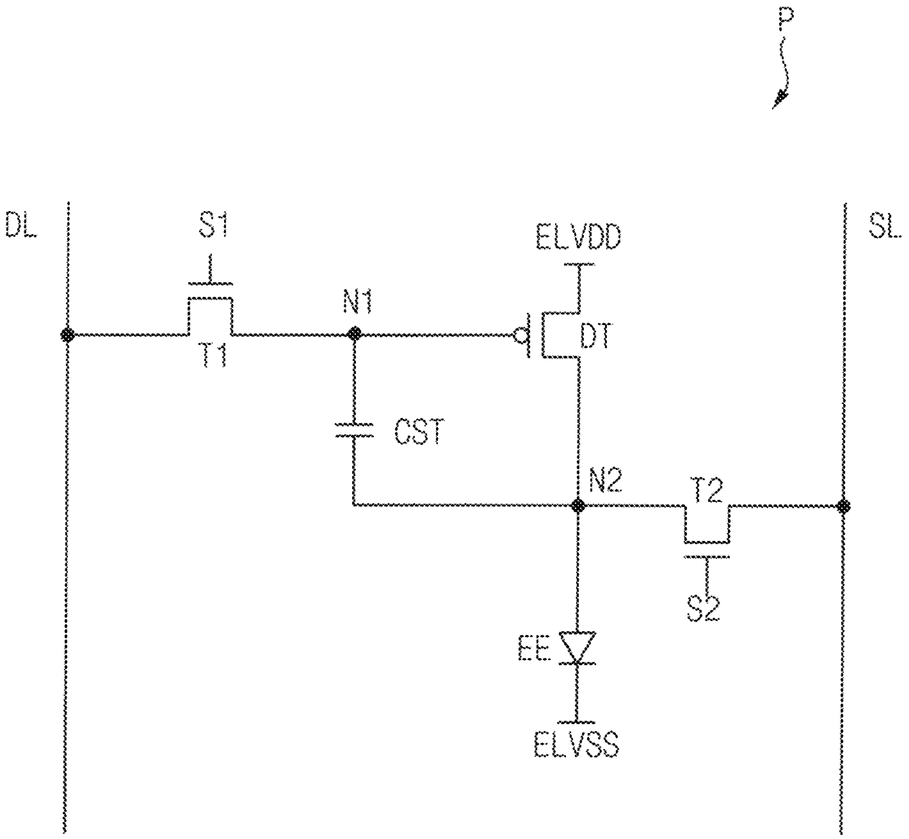
FIG. 2 is a circuit diagram illustrating an example of pixels of the display device of FIG. 1.

FIG. 2 is a circuit diagram illustrating an example of the pixels P of the display device 1000 of FIG. 1.

Referring to FIGS. 2, each of the pixels P may include a first switching transistor T1 for applying the data voltage to a control electrode (i.e., a first node N1) of a driving transistor DT in response to a first gate signal S1, a storage capacitor CST for storing the data voltage, the driving transistor DT for generating a driving current in response to the data voltage, a light emitting element EE for emitting light based on the driving current, and a second switching transistor T2 for flowing the driving current to the sensing line SL in response to a second gate signal S2. For example, the first switching transistor T1 may include a control electrode for receiving the first gate signal S1, a first electrode connected to the data line DL, and a second electrode connected to the first node N1, the storage capacitor CST may include a first electrode connected to the first node N1 and a second electrode connected to the second node N2, the driving transistor DT may include the control electrode connected to the first node N1, a first electrode for receiving a first power voltage ELVDD, and a second electrode connected to the second node N2, the second switching transistor T2 may include a control electrode for receiving the second gate signal S2, a first electrode connected to the second node N2, and a second electrode connected to the sensing line SL, and the light emitting element EE may include an anode electrode connected to the second node N2 and a cathode electrode for receiving a second power voltage ELVSS.

Figure 3:
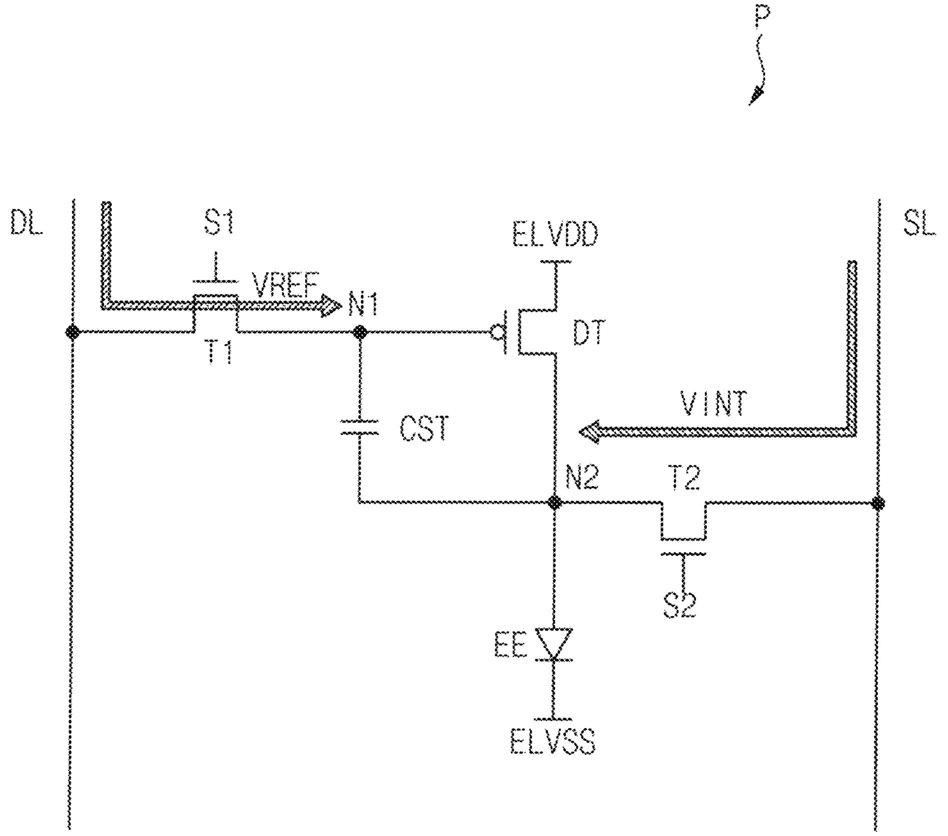
FIGS. 3 and 4 are diagrams illustrating an example in which the display device of FIG. 1 performs a first sensing operation.
Figure 4:
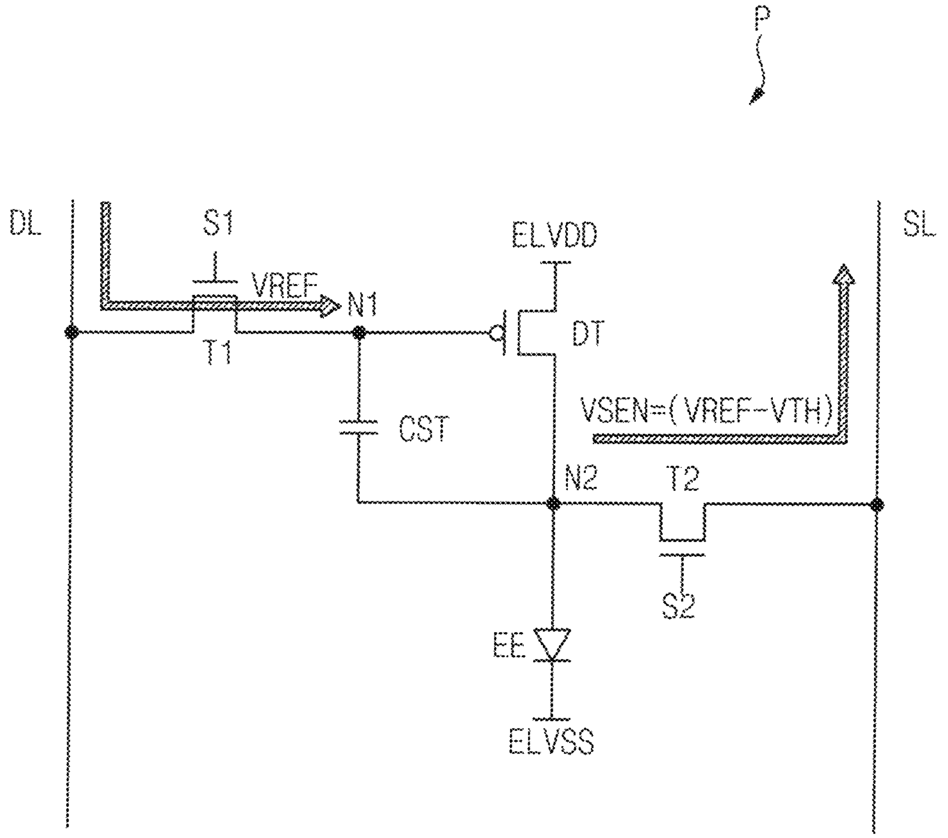

FIGS. 3 and 4 are diagrams illustrating an example in which the display device 1000 of FIG. 1 performs a first sensing operation.

Referring to FIGS. 1, 3 and 4, the display panel driver 10 may receive the first sensing data SD1 for the driving transistor DT from the pixels P by performing the first sensing operation. In an embodiment, the display panel driver 10 may calculate a threshold voltage VTH of the driving transistor DT of each of the pixels P based on the first sensing data SD1.

In an embodiment, for example, the display panel driver 10 may apply an initialization voltage VINT to the anode electrode (i.e., the second node N2) of the light emitting element EE through the sensing line SL, and apply a reference voltage VREF to the control electrode of the driving transistor DT through the data line DL. For example, the first switching transistor T1 may be turned on by the first gate signal S1 having an activation level, the reference voltage VREF applied through the data line DL may be written in the storage capacitor CST through the first switching transistor T1, the second switching transistor T2 may be turned on by the second gate signal S2 having the activation level, and the initialization voltage VINT applied through the sensing line SL may be applied to the anode electrode of the light emitting element EE by the second switching transistor T2.

In an embodiment, for example, after the reference voltage VREF is applied to the storage capacitor CST, the display panel driver 10 may apply the reference voltage VREF to the control electrode of the driving transistor DT through the data line DL, and receive the sensing voltage VSEN applied to the anode electrode of the light emitting element EE through the sensing line SL. For example, the first switching transistor T1 may be turned on by the first gate signal S1 having the activation level, the driving transistor DT may be turned on by the reference voltage VREF, the second switching transistor T2 may be turned on by the second gate signal S2 having the activation level, and then the sensing voltage VSEN may be applied to the sensing line SL through the second switching transistor T2. The sensing voltage VSEN may be a voltage VREF-VTH obtained by subtracting the threshold voltage VTH of the driving transistor DT from the reference voltage VREF. The sensing voltage VSEN received from the pixels P may be the first sensing data SD1. The display panel driver 10 may receive the voltage VREF-VTH (i.e., the first sensing data SD1) obtained by subtracting the threshold voltage VTH of the driving transistor DT from the reference voltage VREF through the sensing line SL.

In an embodiment, before receiving the first sensing data SD1, the display panel driver 10 may turn the first switching transistor T1 on to secure a time for writing the reference voltage VREF to the storage capacitor CST, and may turn the second switching transistor T2 off.

Figure 5:
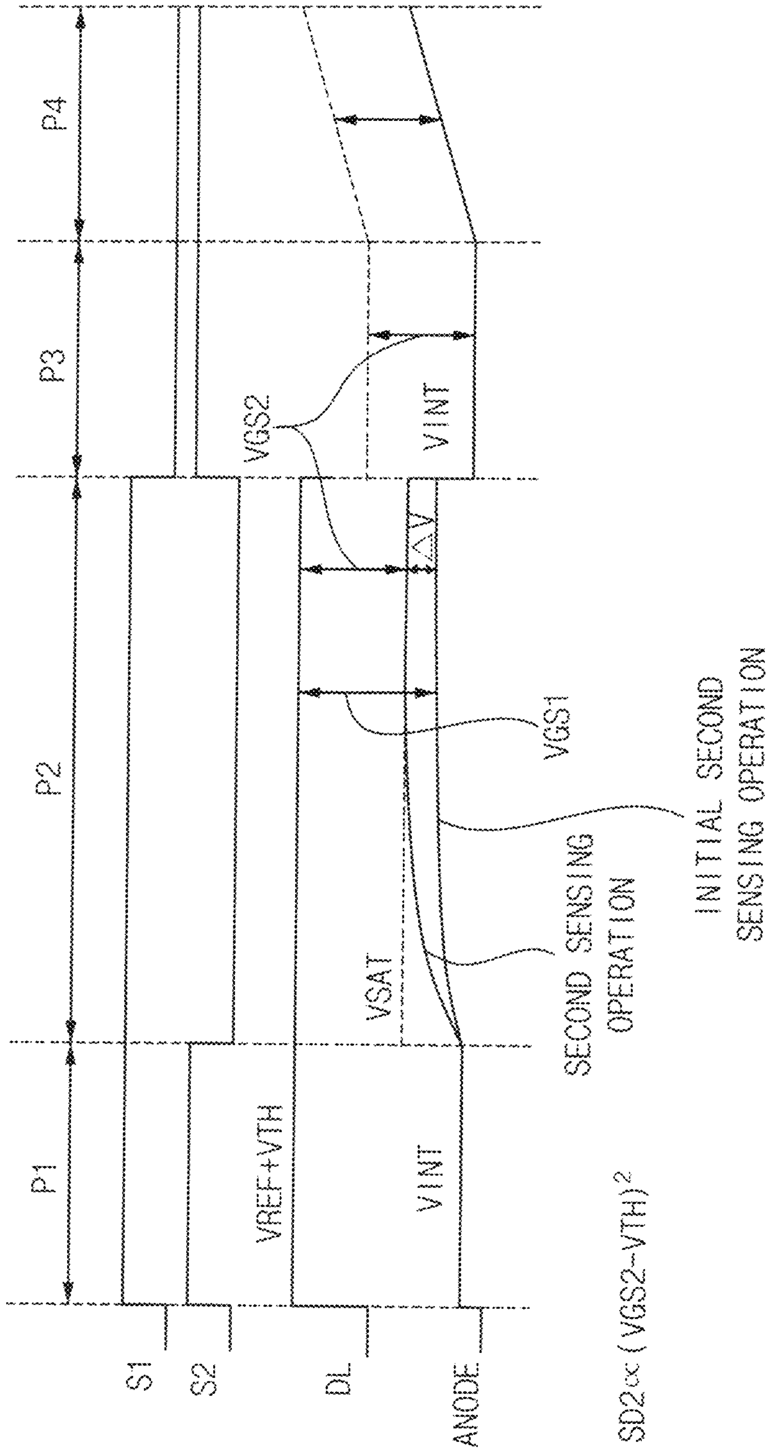
FIG. 5 is a timing diagram illustrating an example in which the display device of FIG. 1 performs a second sensing operation.

FIG. 5 is a timing diagram illustrating an example in which the display device 1000 of FIG. 1 performs a second sensing operation.

Referring to FIGS. 1, 2 and 5, the display panel driver 10 may receive the second sensing data SD2 for the light emitting element EE of the pixels P from the pixels P by performing the second sensing operation. In an embodiment, the display panel driver 10 may apply a voltage VREF+VTH equal to the sum of the threshold voltage VTH and the reference voltage VREF to the control electrode of the driving transistor DT in a first period P1 and a second period P2 of the second sensing operation through the data line DL, apply the initialization voltage VINT to the anode electrode of the light emitting element EE in the first period P1 of the second sensing operation, apply the initialization voltage VINT to the anode electrode of the light emitting element EE in a third period P3 of the second sensing operation through the sensing line SL, and receive the second sensing data SD2 corresponding to a driving current value of the pixels P in a fourth period P4 of the second sensing operation. In an embodiment, the second sensing operation may be performed after the first sensing operation is performed. In FIGS. 2 to 5, the reference voltage VREF for performing the first sensing operation uses the same reference numeral as the reference voltage VREF for performing the second sensing operation, but may have different voltages.

In an embodiment, for example, in the first period P1, the first gate signal S1 and the second gate signal S2 may have the activation level. The display panel driver 10 may apply the initialization voltage VINT to the anode electrode ANODE of the light emitting element EE through the sensing line SL, and apply the voltage VREF+VTH equal to the sum of the threshold voltage VTH and the reference voltage VREF to the control electrode of the driving transistor DT through the data line DL in the first period P1 of the second sensing operation. Accordingly, the first switching transistor T1 may be turned on by the first gate signal S1 having the activation level, the voltage VREF+VTH equal to the sum of the threshold voltage VTH and the reference voltage VREF may be applied to the control electrode of the driving transistor DT through the first switching transistor T1, the second switching transistor T2 may be turned on by the second gate signal S2 having the activation level, and the initialization voltage VINT applied through the sensing line SL may be applied to the anode electrode of the light emitting element EE by the second switching transistor T2.

In an embodiment, for example, in the second period P2, the first gate signal S1 may keep the activation level and the second gate signal S2 may have an inactivation level. In the method of driving the display device 1000, the display panel driver 10 may still apply the voltage VREF+VTH equal to the sum of the threshold voltage VTH and the reference voltage VREF to the control electrode of the driving transistor DT through the data line DL in the second period P2 of the second sensing operation. Accordingly, the first switching transistor T1 may keep the turned-on state by the first gate signal S1 having the activation level, the voltage VREF+VTH equal to the sum of the threshold voltage VTH and the reference voltage VREF applied through the data line DL may still be applied to the control electrode of the driving transistor DT through the first switching transistor T1, and the second switching transistor T2 may be turned off by the second gate signal having the inactivation level. Accordingly, the voltage VREF+VTH equal to the sum of the threshold voltage VTH of the driving transistor DT and the reference voltage VREF may be written in the storage capacitor CST, and a voltage of the second electrode (i.e., the second node N2, the anode electrode ANODE of the light emitting element EE) of the driving transistor DT may gradually rise from the initialization voltage VINT and to be saturated (i.e., may be a saturation voltage VSAT) by gradually decreasing a rising width in the second period P2.

In an embodiment, for example, in the third period P3, the first gate signal S1 may have the inactivation level, and the second gate signal S2 may have the activation level. The display panel driver 10 may apply the initialization voltage VINT to the anode electrode ANODE of the light emitting element EE through the sensing line SL in the third period P3 of the second sensing operation. Accordingly, the first switching transistor T1 may be turned off by the first gate signal S1 having the inactivation level, the control electrode of the driving transistor DT may be in a floating state, the second switching transistor T2 may be turned on by the second gate signal S2 having the activation level, and the initialization voltage VINT applied through the sensing line SL may be applied to the light emitting element EE by the second switching transistor T2. Since the control electrode of the driving transistor DT is in the floating state, a voltage of the control electrode of the driving transistor DT may be decreased as much as a voltage of the anode electrode ANODE of the light emitting element EE is decreased. Accordingly, a gate-source voltage VGS2 (in this example, VGS2=VREF÷VTH−VSAT) of the driving transistor DT in a saturation state may be maintained in the third period P3 and a fourth period P4.

In an embodiment, for example, in the fourth period P4, the first gate signal S1 may keep the inactivation level, and the second gate signal S2 may keep the activation level. The display panel driver 10 may receive a driving current through the sensing line SL in the fourth period P4 of the second sensing operation. Accordingly, the first switching transistor T1 may keep the turned-off state by the first gate signal S1 having the inactivation level, and the driving transistor DT may generate the driving current proportional to a square of a voltage obtained by subtracting the threshold voltage VTH of the driving transistor DT from the gate-source voltage VGS2 of the driving transistor DT in the saturation state (i.e., $(VGS2-VTH)^2$), the second switching transistor T2 may keep the turned-on state by the second gate signal S2 having the activation level, and the driving current may be applied to the sensing line SL through the second switching transistor T2. The driving current received from the pixels P may be second sensing data SD2. Accordingly, the display panel driver 10 may receive the square of the voltage obtained by subtracting the threshold voltage VTH of the driving transistor DT from the gate-source voltage VGS2 of the driving transistor DT in the saturation state (i.e., the gate-source voltage VGS2 of the driving transistor DT corresponding to the driving current) (i.e., $(VGS2-VTH)^2$) (i.e., the second sensing data SD2). Since the gate-source voltage VGS2 of the driving transistor DT corresponding to the driving current is a voltage obtained by subtracting the saturation voltage VSAT from the voltage VREF+VTH equal to the sum of the threshold voltage VTH and the reference voltage VREF of the driving transistor DT, the driving current may not be affected by the threshold voltage VTH of the driving transistor DT (Because, $SD2 \propto (VGS2-VTH)^2 = ((VREF+VTH-VSAT)-VTH)^2 = (VREF-VSAT)^2$).

As the light emitting element EE is degraded, a resistance of the light emitting element EE may increase, so that the voltage of the anode electrode ANODE of the light emitting element EE rises (i.e., increases by $\Delta V$) compared to when an initial second sensing operation is performed. Accordingly, by comparing the second sensing data SD2 received by performing the second sensing operation with initial second sensing data ISD2 received by performing the initial second sensing operation (i.e., calculating a change rate of the second sensing data SD2), a degree of degradation of the light emitting element EE may be sensed. The initial second sensing operation may mean the second sensing operation performed first. That is, the initial second sensing operation may be the second sensing operation performed before the light emitting element EE is degraded.

However, the second sensing data SD2 may not represent an intensity of stress applied to the light emitting element EE during a degradation time. Even when the voltage of the anode electrode ANODE of the light emitting element EE is the same, a luminance of an image displayed by the light emitting element EE may vary according to the intensity of the stress applied to the light emitting element EE. Accordingly, when the input image data IMG is compensated based on the degradation rate of the light emitting device EE determined based on only the second sensing data SD2, accurate compensation may not be performed due to the intensity of the stress. The threshold voltage VTH of the driving transistor DT may hardly change when a low grayscale image (i.e., a low-stress image) is displayed, and may change significantly when a high grayscale image (i.e., a high-stress image) is displayed. Accordingly, the greater the degree of degradation of the driving transistor DT (i.e., the change amount of the threshold voltage VTH of the driving transistor DT), the greater the intensity of the stress applied to the light emitting element EE. That is, by reflecting the change amount of the threshold voltage of the driving transistor DT to the degradation rate of the light emitting element EE, the input image data IMG may be more accurately compensated.

Referring to FIGS. 1 to 5, the display panel driver 10 may calculate the change amount of the threshold voltage VTH of the driving transistor DT, may calculate a change rate of the second sensing data SD2, and may determine the degradation rate of the light emitting element EE based on the change rate of the second sensing data SD2 and the change amount of the threshold voltage VTH of the driving transistor DT.

As described above, the greater the change amount of the threshold voltage VTH of the driving transistor DT, the greater the intensity of the stress applied to the light emitting element EE. Accordingly, the change amount of the threshold voltage VTH of the driving transistor DT may be a value representing the intensity of the stress applied to the light emitting element EE. For example, as the intensity of the stress applied to the light emitting element EE increases, the luminance of the pixels P may decrease. Therefore, the greater the change amount of the threshold voltage VTH of the driving transistor DT, the greater the degradation rate of the light emitting element EE may have a larger value. As a result, even when the change rate of the second sensing data SD2 is the same, the degradation rate of the light emitting element EE may vary according to the amount of the stress applied to the light emitting element EE. However, a value representing the intensity of the stress applied to the light emitting element EE may include not only the change amount of the threshold voltage VTH of the driving transistor DT, but also an on-duty ratio of the first gate signal S1 and the change rate of the second sensing data SD2 per time.

In an embodiment, for example, the change amount ΔVTH of the threshold voltage VTH of the driving transistor DT may be a difference between an initial threshold voltage IVTH of the driving transistor DT calculated through an initial first sensing operation and the threshold voltage VTH of the driving transistor DT calculated through the first sensing operation at the current time. The initial first sensing operation may mean the first sensing operation performed first. That is, the initial first sensing operation may be the first sensing operation performed before the light emitting element EE is degraded.

In an embodiment, for example, the change rate of the second sensing data may be a ratio of the initial second sensing data ISD2 received by performing the initial second sensing operation to the second sensing data SD2 received by performing the second sensing operation at a current time. For example, the change rate of the second sensing data SD2 may be calculated using Equation 1.

$$RSD2 = \frac{SD2}{ISD2}, \quad \text{[Equation 1]}$$

where RSD2 is the change rate of the second sensing data, SD2 is the second sensing data, and ISD2 is the initial second sensing data. As described above, the second sensing data SD2 may be proportional to the square of the voltage obtained by subtracting the threshold voltage VTH of the driving transistor DT from the gate-source voltage VGS2 of the driving transistor DT corresponding to the driving current (i.e., $(VGS-VTH)^2$). For example, when the current characteristic coefficient of the driving transistor DT is K, the second sensing data SD2 may be calculated using Equation 2.

$$SD2=K^{*}(VGS2-VTH)^2, \quad \text{[Equation 2]}$$

where SD2 is the second sensing data, K is the current characteristic coefficient of the driving transistor, VGS2 is the gate-source voltage of the driving transistor corresponding to the driving current in the second sensing operation, and VTH is the threshold voltage of the driving transistor. Like the second sensing data SD2, the initial second sensing data may be proportional to a square of a voltage obtained by subtracting the threshold voltage VTH of the driving transistor DT from an initial gate-source voltage VGS1 of the driving transistor DT corresponding to the driving current (i.e., $(VGS1-IVTH)^2$, where VGS1 is the initial gate-source voltage of the driving transistor DT corresponding to the driving current in the initial second sensing operation, and IVTH is an initial threshold voltage of the driving transistor DT.). The current characteristic coefficient of the driving transistor DT may be a value that varies depending on a specification of the driving transistor DT. All of the pixels P include the same type of driving transistors DT, and the current characteristic coefficient of the driving transistor DT may be the current characteristic coefficient of the driving transistor DT, which is a representative of the same type of driving transistors DT.

In an embodiment, for example, when the current characteristic coefficient of the driving transistor DT is K, the initial second sensing data may be calculated using Equation 3.

$$ISD2=K\times(VGS2-IVTH(TDT))^2, \quad \text{[Equation 3]}$$

where ISD2 is the initial second sensing data, K is the current characteristic coefficient of the driving transistor, VGS2 is the gate-source voltage of the driving transistor corresponding to the driving current in the second sensing operation, and IVTH is the initial threshold voltage of the driving transistor. The initial threshold voltage of the driving transistor DT may be the threshold voltage of the driving transistor DT calculated based on the initial first sensing data received by performing the initial first sensing operation. That is, the initial threshold voltage of the driving transistor DT may be the threshold voltage before the driving transistor DT is degraded. As described above, as the light emitting element EE is degraded, the gate source voltage VGS2 corresponding to the driving current may decrease, so that the change rate of the second sensing data SD2 may have a value of 1 or less.

In an embodiment, for example, since the luminance of the pixels P decreases as the intensity of the stress applied to the light emitting element EE increases, the degradation rate of the light emitting element EE may increase as the change amount of the threshold voltage VTH of the driving transistor DT increases. For example, the degradation rate of the light emitting element EE may be determined using Equation 4.

$$DR = \frac{(VGS2 - VTH + \Delta VTH)^2}{(VGS1 - IVTH)^2}, \quad \text{[Equation 4]}$$

where DR is the degradation rate of the light emitting element, VGS2 is the gate-source voltage of the driving transistor corresponding to the driving current in the second sensing operation, VTH is the threshold voltage of the driving transistor, ΔVTH is the change amount of the threshold voltage of the driving transistor, VGS1 is the initial gate-source voltage of the driving transistor corresponding to the driving current in the initial second sensing operation, and IVTH is the initial threshold voltage of the driving transistor DT calculated based on the initial first sensing data received by performing the initial first sensing operation. That is, by adding the change amount of the threshold voltage VTH of the driving transistor DT to the gate source voltage VGS2 of the driving transistor DT corresponding to the driving current, the intensity of the stress applied to the light emitting element EE may be reflected.

Also, when the above equations are arranged, the degradation rate of the light emitting element EE may be determined using Equations 5 and 6.

$$RSD2 = \frac{SD2}{ISD2}, \quad \text{[Equation 5]}$$

and $$DR = RSD + \frac{2 \times \Delta VTH}{(ISD2/K)^{\frac{1}{2}}} \times RSD2^{\frac{1}{2}} + \frac{(\Delta VTH)^2}{(ISD2/K)}, \quad \text{[Equation 6]}$$

where RSD2 is the change rate of the second sensing data, SD2 is the second sensing data, ISD2 is the initial second sensing data, DR is the degradation rate of the light emitting element, ΔVTH is the change amount of the threshold voltage of the driving transistor, K is the current characteristic coefficient of the driving transistor.

The display panel driver 10 may compensate for the input image data IMG based on the degradation rate of the light emitting element EE. The display panel driver 10 may compensate for the input image data IMG based on the degradation rate of the light emitting element EE in which the intensity of the stress applied to the light emitting element EE is reflected. So, the input image data IMG may be compensated more accurately.

In an embodiment, the display panel driver 10 may compensate for the input image data IMG based on the degradation-luminance model. The degradation-luminance model may be generated from a representative display device selected for the degradation-luminance model extraction among display devices. The representative display device may determine the degradation rate of the light emitting element of the representative display device in the same manner as the display device 1000 of FIG. 1, and measure the luminance according to the degradation rate of the light emitting element of the representative display device. The degradation-luminance model representing the luminance according to the degradation rate of the light emitting element EE may be generated based on the measured luminance and the degradation rate of the light emitting element of the representative display device. The display device 1000 may predict the luminance according to the degradation rate of the light emitting element EE determined based on the degradation-luminance model, and compensate for the input image data IMG based on the predicted luminance. Since the representative display device determines the degradation rate of the light emitting element of the representative display device in the same manner as the display device 1000 of FIG. 1, a consistency of the degradation-luminance model may be enhanced. Accordingly, the display device 1000 may display an image having uniform luminance regardless of the stress applied to the light emitting element EE.

Figure 6:
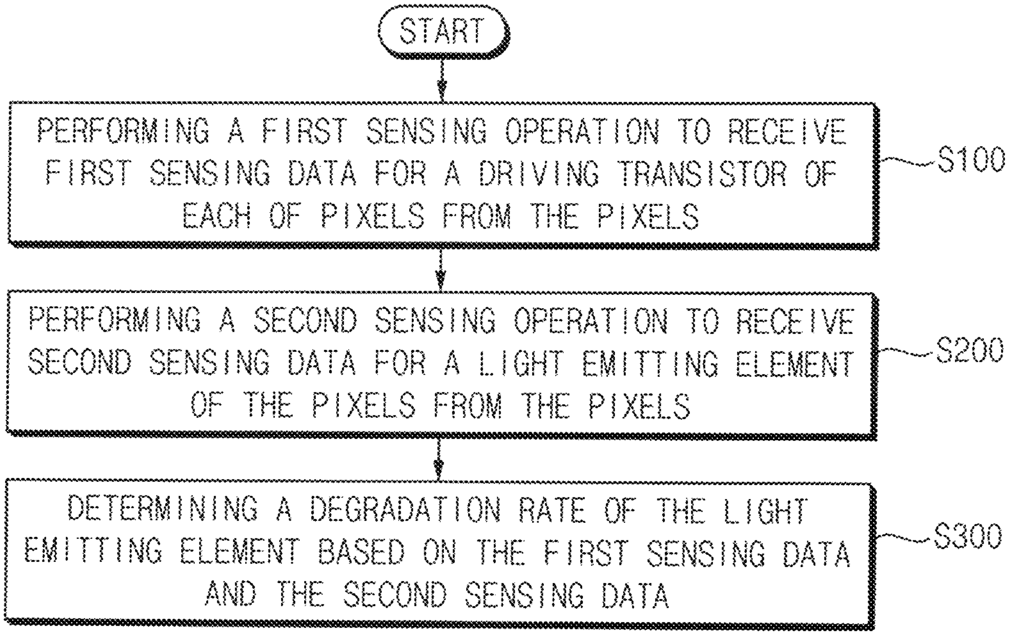
FIG. 6 is a flowchart illustrating a method of driving a display device according to embodiments of the present invention.
Figure 7:
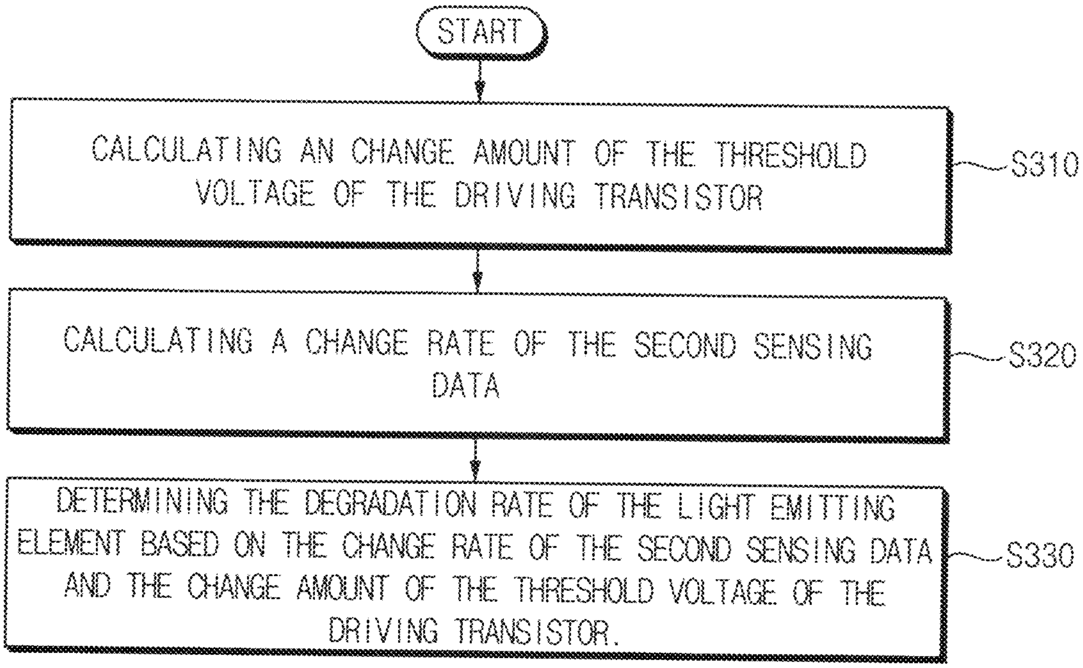
FIG. 7 is a flowchart illustrating an example of determining a degradation rate of a light emitting element according to the method of FIG. 6.

FIG. 6 is a flowchart illustrating a method of driving a display device according to embodiments of the present invention, and FIG. 7 is a flowchart illustrating an example of determining a degradation rate of a light emitting element according to the method of FIG. 6.

Referring to FIG. 6, the method of FIG. 6 may perform the first sensing operation to receive the first sensing data for the driving transistor of each of the pixels from the pixels (S100), perform the second sensing operation to receive the second sensing data for the light emitting element of the pixels from the pixels (S200), and determine the degradation rate of the light emitting element based on the first sensing data and the second sensing data (S300). The method of FIG. 6, may calculate the threshold voltage of the driving transistor based on the first sensing data.

Specifically, the method of FIG. 6 may perform the second sensing operation to receive the second sensing data for the light emitting element of the pixels from the pixels (S200). In an embodiment, the method of FIG. 7 may apply the voltage equal to the sum of the threshold voltage and the reference voltage to the control electrode of the driving transistor in the first period and the second period of the second sensing operation, apply the initialization voltage to the anode electrode of the light emitting element in the first period of the second sensing operation, apply the initialization voltage to the anode electrode of the light emitting element in the third period of the second sensing operation, and receive the second sensing data corresponding to the driving current value of the pixels in the fourth period of the second sensing operation. In an embodiment, the second sensing operation may be performed after the first sensing operation is performed.

Referring to FIGS. 6 and 7, specifically, the method of FIG. 6 may determine the degradation rate of the light emitting element based on the first sensing data and the second sensing data (S300). In an embodiment, the method of FIG. 7 may calculate the change amount of the threshold voltage of the driving transistor (S310), calculate the change rate of the second sensing data (S320), and determine the degradation rate of the light emitting element based on the change rate of the second sensing data and the change amount of the threshold voltage of the driving transistor (S330).

Figure 8:
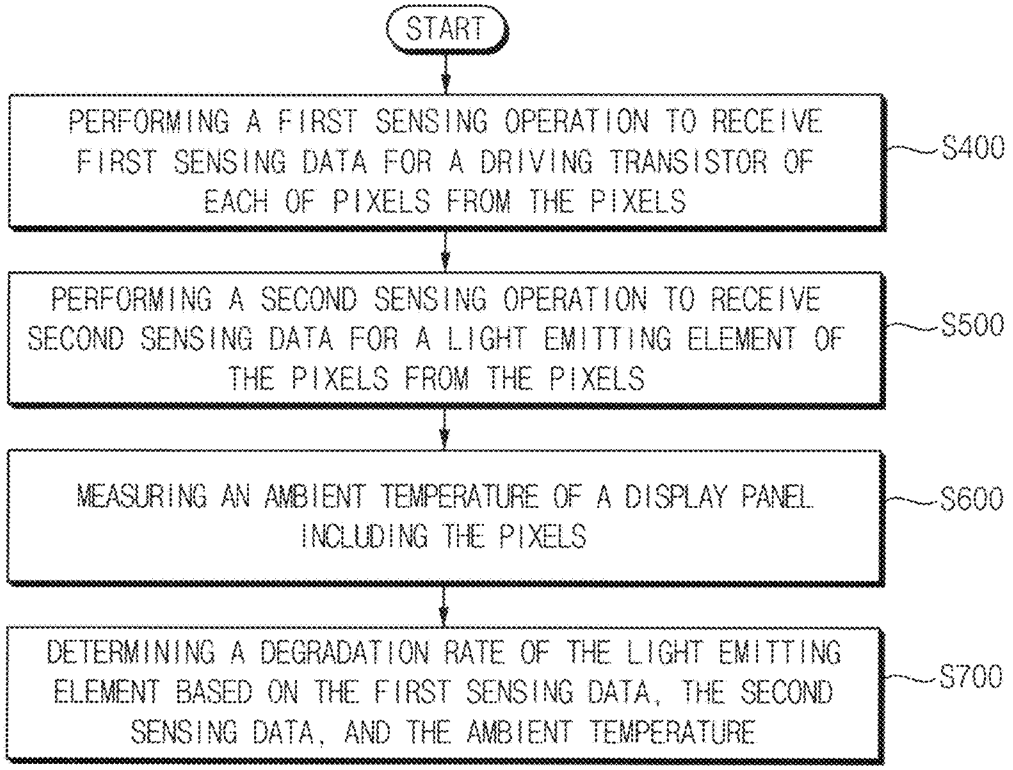
FIG. 8 is a flowchart illustrating a method of driving a display device according to embodiments of the present invention.
Figure 9:
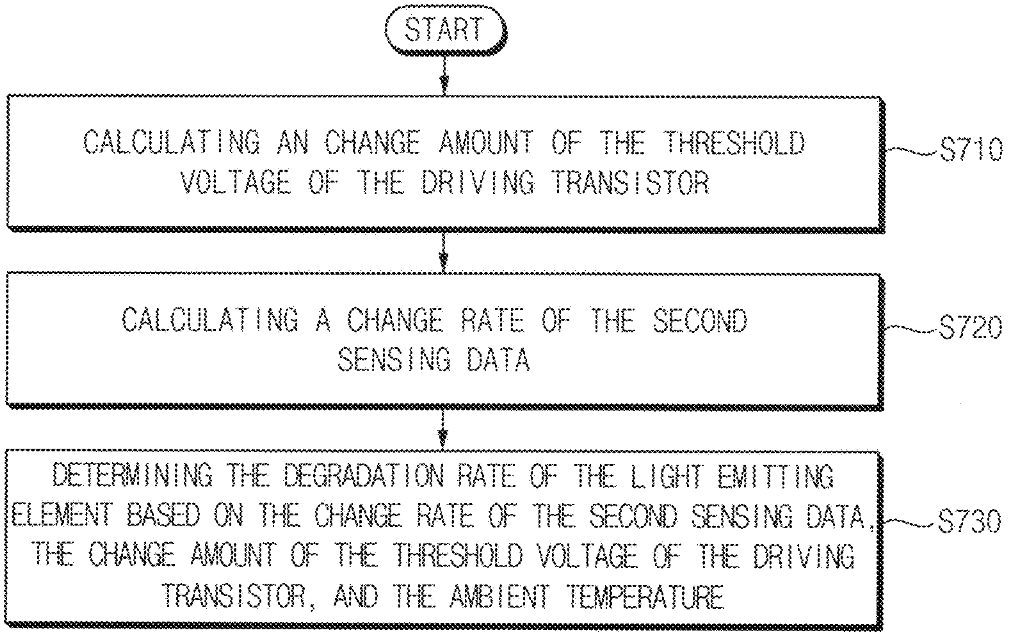
FIG. 9 is a flowchart illustrating an example of determining a degradation rate of a light emitting element according to the method of FIG. 8.
Figure 10:
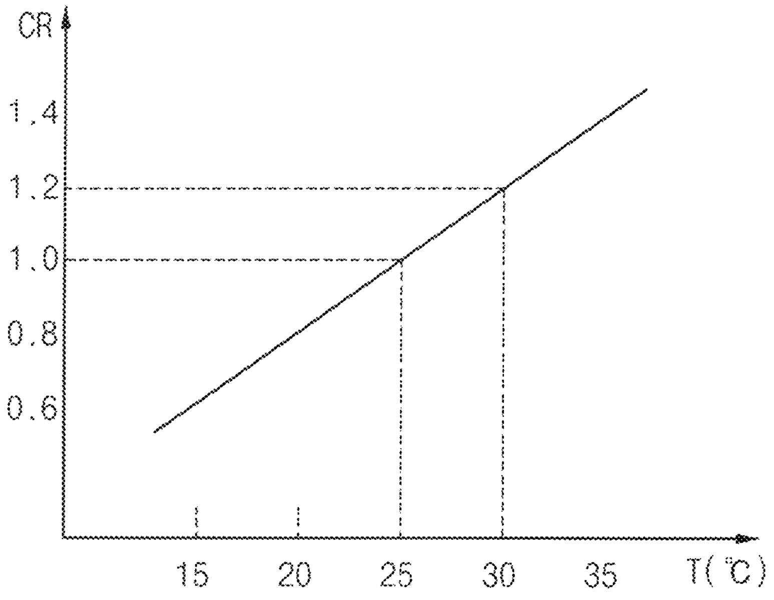
FIG. 10 is a graph illustrating an example of a temperature-driving current lookup table according to the method of FIG. 8.

FIG. 8 is a flowchart illustrating a method of driving a display device according to embodiments of the present invention, FIG. 9 is a flowchart illustrating an example of determining a degradation rate of a light emitting element according to the method of FIG. 8, and FIG. 10 is a graph illustrating an example of a temperature-driving current lookup table according to the method of FIG. 8.

The display device according to the present embodiment is substantially the same as operations of the display device 1000 of FIG. 1 except for measuring an ambient temperature and determining the degradation rate. Thus, the same reference numerals are used to refer to the same or similar element, and any repetitive explanation will be omitted. Referring to FIG. 8, the method of FIG. 8 may perform the first sensing operation to receive the first sensing data for the driving transistor of each of the pixels from the pixels (S400), perform the second sensing operation to receive the second sensing data for the light emitting element of the pixels from the pixels, (S500), measure the ambient temperature of the display panel including the pixels (S600), and determine the degradation rate of the light emitting element based on the first sensing data, the second sensing data, and the ambient temperature (S700). In an embodiment, the display device of FIG. 8 may further include a temperature sensor, and the temperature sensor may measure the ambient temperature of the display panel.

Referring to FIGS. 8 and 9, the method of FIG. 8 may determine the degradation rate of the light emitting element based on the first sensing data, the second sensing data, and the ambient temperature (S700). The method of FIG. 9 may calculate the change amount of the threshold voltage of the driving transistor (S710), calculate the change rate of the second sensing data (S720), and determine the degradation rate of the light emitting element based on the change rate of the second sensing data, the change amount of the threshold voltage of the driving transistor, and the ambient temperature (S730). In an embodiment, the method of FIG. 8 may determine a first change rate of the driving current for the ambient temperature when the second sensing data is received based on the temperature-driving current lookup table for a change rate of the driving current according to a temperature, and determine a second change rate of the driving current for the ambient temperature when the initial second sensing data is received based on the temperature-driving current lookup table, and the degradation rate of the light emitting element may be determined based on the change amount of the threshold voltage of the driving transistor, the change rate of the second sensing data, the first change rate of the driving current, and the second change rate of the driving current.

When the ambient temperature is changed, the driving current of the pixels P may be changed. Accordingly, if the ambient temperature when the second sensing data is received and the ambient temperature when the initial second sensing data is received are different, the change rate of the second sensing data SD2 may change. Accordingly, by compensating for the change rate of the second sensing data SD2 by the changed ambient temperature and determining the degradation rate of the light emitting element based on the compensated change rate of the second sensing data SD2, the input image data IMG may be compensated without deviation according to a temperature.

Referring to FIGS. 8 to 10, the temperature-driving current lookup table may include information on a change rate of the driving current of a transistor according to a temperature. For example, the temperature-driving current lookup table may be generated by measuring a value of the driving current of the driving transistor DT (or the representative driving transistor selected for generating the temperature-driven current lookup table) while changing the ambient temperature.

The temperature-driving current lookup table may include information on a change rate CR of the driving current according to a temperature. For example, based on 25 degrees in Celsius (° C.), the change rate of the driving current CR at 25° C. may be 1. Also, assuming that the driving current increases by 20 percentages (%) when the temperature T increases from 25° C. to 30° C., the change rate CR of the driving current at 30° C. may be 1.2. In this case, if the ambient temperature when the second sensing data SD2 is received is 30° ° C., and the ambient temperature when the initial second sensing data is received is 25° C., the change rate of the second sensing data SD2 may be 1.2 times greater than the change rate of the second sensing data SD2 in a case that the ambient temperature when the second sensing data SD2 is received is 25° C., and the ambient temperature when the initial second sensing data is received is 25° C. Therefore, it is desirable to compensate for the change rate of the second sensing data SD2 by the changed ambient temperature.

In an embodiment, for example, the degradation rate of the light emitting element may be determined using Equations 7 and 8.

$$RSD2 = \frac{SD2}{ISD2}, \qquad \text{[Equation 7]}$$

and

[Equation 8]

$$DR = \left(RSD2 \times \frac{CR2}{CR1}\right) + \frac{2 \times \Delta VTH}{(ISD2/K)^{\frac{1}{2}}} \times \left(RSD2 \times \frac{CR2}{CR1}\right)^{\frac{1}{2}} + \frac{(\Delta VTH)^2}{(ISD2/K)},$$

where RSD2 is the change rate of the second sensing data, SD2 is the second sensing data, ISD2 is the initial second sensing data, DR is the degradation rate of the light emitting element, ΔVTH is the change amount of the threshold voltage of the driving transistor, K is the current characteristic coefficient of the driving transistor, CR1 is the first change rate of the driving current, and CR2 is the second change rate of the driving current. For example, based on that the ambient temperature when the initial second sensing data is received is 25° C., the change rate CR of 25° C. may be 1. Also, assuming that the driving current increases by 20% when the temperature T increases from 25° C. to 30° C., the change rate CR of the driving current at 30° C. may be 1.2. In this case, if the ambient temperature when the second sensing data is received is 30° C. and the ambient temperature when the initial second sensing data is received is 25° C., the change rate of the second sensing data SD2 may be 1.2 times greater than the change rate of the second sensing data SD2 in a case that the ambient temperature when the second sensing data SD2 is received is 25° C., and the ambient temperature when the initial second sensing data is received is 25° C. Accordingly, by treating of multiplying $$\frac{\text{first change rate of driving current}}{\text{second change rate of driving current}}$$

to the change rate CR of the second sensing data, the change rate of the second sensing data SD2 by the changed ambient temperature may be compensated.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:

a display panel configured to display an image based on input image data; and a display panel driver configured to drive the display panel, wherein the display panel driver is configured to receive first sensing data for a driving transistor of each pixel of the display panel by performing a first sensing operation on the each pixel, to receive second sensing data for a light emitting element of the each pixel by performing a second sensing operation on the each pixel, and to compensate for the input image data based on a degradation rate of the light emitting element which is determined based on the first sensing data and the second sensing data.

2. The display device of claim 1, wherein the display panel driver is configured to calculate a threshold voltage of the driving transistor based on the first sensing data.

3. The display device of claim 2, wherein the display panel driver is configured to apply a voltage equal to a sum of the threshold voltage and a reference voltage to a control electrode of the driving transistor in a first period and a second period of the second sensing operation, wherein the display panel driver is configured to apply an initialization voltage to an anode electrode of the light emitting element in the first period of the second sensing operation, wherein the display panel driver is configured to apply the initialization voltage to the anode electrode of the light emitting element in a third period of the second sensing operation, and wherein the display panel driver is configured to receive the second sensing data corresponding to a driving current value of each pixel in a fourth period of the second sensing operation.

4. The display device of claim 3, wherein the second sensing operation is performed after the first sensing operation is performed.

5. The display panel driver of claim 3, wherein the degradation rate of the light emitting element is determined by calculating a change amount of the threshold voltage of the driving transistor, by calculating a change rate of the second sensing data, and by calculating the degradation rate of the light emitting element based on the change rate of the second sensing data and the change amount of the threshold voltage of the driving transistor.

6. The display device of claim 5, wherein the degradation of the light emitting element is determined using equations:

$$RSD2=\frac{SD2}{ISD2}$$

and $$DR=RSD2+\frac{2\times\Delta VTH}{(ISD2/K)^{\frac{1}{2}}}\times RSD2^{\frac{1}{2}}+\frac{(\Delta VTH)^2}{(ISD2/K)},$$

where RSD2 is the change rate of the second sensing data, SD2 is the second sensing data, ISD2 is initial second sensing data, DR is the degradation rate of the light emitting element, ΔVTH is the change amount of the threshold voltage of the driving transistor, and K is a current characteristic coefficient of the driving transistor.

7. A method of driving a display device comprising:

performing a first sensing operation on each pixel of a display panel to receive first sensing data for a driving transistor of the each pixel;

performing a second sensing operation on the each pixel to receive second sensing data for a light emitting element of the each pixel; and compensating for input image data, which is to be provided to the display panel, based on a degradation rate of the light emitting element which is determined based on the first sensing data and the second sensing data.

8. The method of claim 7, further comprising:

calculating a threshold voltage of the driving transistor based on the first sensing data.

9. The method of claim 8, wherein performing the second sensing operation comprises:

applying a voltage equal to a sum of the threshold voltage and a reference voltage to a control electrode of the driving transistor in a first period and a second period of the second sensing operation;

applying an initialization voltage to an anode electrode of the light emitting element in the first period of the second sensing operation;

applying the initialization voltage to the anode electrode of the light emitting element in a third period of the second sensing operation; and receiving the second sensing data corresponding to a driving current value of the each pixel in a fourth period of the second sensing operation.

10. The method of claim 9, wherein the second sensing operation is performed after the first sensing operation is performed.

11. The method of claim 9, wherein the degradation rate of the light emitting element is determined by calculating a change amount of the threshold voltage of the driving transistor, by calculating a change rate of the second sensing data, and by calculating the degradation rate of the light emitting element based on the change rate of the second sensing data and the change amount of the threshold voltage of the driving transistor.

12. The method of claim 11, wherein the degradation of the light emitting element is determined using equations:

$$RSD2=\frac{SD2}{ISD2}$$

and $$DR=RSD2+\frac{2\times\Delta VTH}{(ISD2/K)^{\frac{1}{2}}}\times RSD2^{\frac{1}{2}}+\frac{(\Delta VTH)^2}{(ISD2/K)},$$

where RSD2 is the change rate of the second sensing data, SD2 is the second sensing data, ISD2 is initial second sensing data, DR is the degradation rate of the light emitting element, ΔVTH is the change amount of the threshold voltage of the driving transistor, and K is a current characteristic coefficient of the driving transistor.

13. A method of driving a display device comprising:

performing a first sensing operation on each pixel of a display panel to receive first sensing data for a driving transistor of each pixel;

performing a second sensing operation on each pixel to receive second sensing data for a light emitting element of each pixel;

measuring an ambient temperature of the display panel; and compensating for input image data, which is to be provided to the display panel, based on a degradation rate of the light emitting element which is determined based on the first sensing data, the second sensing data, and the ambient temperature.

14. The method of claim 13, further comprising:

calculating a threshold voltage of the driving transistor based on the first sensing data.

15. The method of claim 14, wherein performing the second sensing operation comprises:

applying a voltage equal to a sum of the threshold voltage and a reference voltage to a control electrode of the driving transistor in a first period and a second period of the second sensing operation;

applying an initialization voltage to an anode electrode of the light emitting element in the first period of the second sensing operation;

applying the initialization voltage to the anode electrode of the light emitting element in a third period of the second sensing operation; and receiving the second sensing data corresponding to a driving current value of each pixel in a fourth period of the second sensing operation.

16. The method of claim 15, wherein the second sensing operation is performed after the first sensing operation is performed.

17. The method of claim 15, wherein the degradation rate of the light emitting element is determined by calculating a change amount of the threshold voltage of the driving transistor, by calculating a change rate of the second sensing data, and by calculating the degradation rate of the light emitting element based on the change rate of the second sensing data, the change amount of the threshold voltage of the driving transistor, and the ambient temperature.

18. The method of claim 15, wherein the degradation rate of the light emitting element is determined by calculating a change amount of the threshold voltage of the driving transistor, by calculating a change rate of the second sensing data, by calculating a first change rate of a driving current due to the ambient temperature when the second sensing data is received, by calculating a second change rate of the driving current due to the ambient temperature when initial second sensing data is received, and by calculating the degradation rate of the light emitting element based on the change rate of the second sensing data, the change amount of the threshold voltage of the driving transistor, the first change rate of the driving current, and the second change rate of the driving current.

19. The method of claim 18, wherein the first change rate of the driving current and the second change rate of the driving current are calculated based on a temperature-driving current lookup table for a change rate of the driving current according to a temperature.

20. The method of claim 18, wherein the degradation rate of the light emitting element is determined using equations:

$$RSD2 = \frac{SD2}{ISD2}$$

and $$DR = \left(RSD2 \times \frac{CR2}{CR1}\right) + \frac{2 \times \Delta VTH}{(ISD2/K)^{\frac{1}{2}}} \times \left(RSD2 \times \frac{CR2}{CR1}\right)^{\frac{1}{2}} + \frac{(\Delta VTH)^2}{(ISD2/K)},$$

where RSD2 is the change rate of the second sensing data, SD2 is the second sensing data, ISD2 is the initial second sensing data, DR is the degradation rate of the light emitting element, ΔVTH is the change amount of the threshold voltage of the driving transistor, K is a current characteristic coefficient of the driving transistor, CR1 is the first change rate of the driving current, and CR2 is the second change rate of the driving current.

* * * * *